United States Patent
Lussier et al.

(10) Patent No.: US 7,060,037 B2
(45) Date of Patent: Jun. 13, 2006

(54) DIGITAL THERMOMETER FOR MEASURING BODY TEMPERATURE

(75) Inventors: Sherin B. Lussier, North Providence, RI (US); Melinda F. Penney, Providence, RI (US); Dalita R. Tomellini, Rehoboth, MA (US)

(73) Assignee: MEDport, LLC, Providence, RI (US)

( * ) Notice: Subject to any disclaimer, the term of this patent is extended or adjusted under 35 U.S.C. 154(b) by 0 days.

(21) Appl. No.: 10/141,429

(22) Filed: May 8, 2002

(65) Prior Publication Data
US 2003/0212339 A1    Nov. 13, 2003

(51) Int. Cl.
*A61B 5/00*    (2006.01)
(52) U.S. Cl. .................................... 600/549; D10/57
(58) Field of Classification Search ........ 600/300–301, 600/549; D10/52, 57; 374/100, 165, 170
See application file for complete search history.

(56) References Cited

U.S. PATENT DOCUMENTS

| | | | | |
|---|---|---|---|---|
| 2,445,539 A | * | 7/1948 | Singer ........................ | 600/549 |
| 2,817,236 A | * | 12/1957 | Van Alstyne, Jr. .......... | 600/549 |
| 3,695,110 A | | 10/1972 | Biolik | |
| 3,946,613 A | | 3/1976 | Silver | |
| 4,502,794 A | * | 3/1985 | Leverty ..................... | 374/194 |
| 4,741,627 A | | 5/1988 | Fukui et al. | |
| 4,813,790 A | * | 3/1989 | Frankel et al. .............. | 274/208 |
| D300,609 S | * | 4/1989 | Leverty ....................... | D10/60 |
| 5,013,161 A | * | 5/1991 | Zaragoza et al. ........... | 374/208 |
| 5,018,875 A | | 5/1991 | Cook | |
| 5,165,798 A | * | 11/1992 | Watanabe ................... | 374/208 |
| 5,176,704 A | * | 1/1993 | Berndt ........................ | 374/151 |
| 5,312,187 A | * | 5/1994 | Chiu ........................... | 374/151 |
| 5,458,121 A | | 10/1995 | Harada | |
| 5,534,013 A | | 7/1996 | Zeindler | |
| 5,575,563 A | | 11/1996 | Chiu et al. | |
| 5,660,168 A | * | 8/1997 | Ottosson et al. ....... | 128/200.24 |

(Continued)

FOREIGN PATENT DOCUMENTS

JP    59-1607    11/1984

(Continued)

OTHER PUBLICATIONS

"Integral" The American Heritage Dictionary of the English Language, Fourth Edition. 2000. Houghton Mifflin Company.*

Primary Examiner—Robert L. Nasser
Assistant Examiner—Patricia C Mallari
(74) Attorney, Agent, or Firm—Cook, Alex, McFarron, Manzo, Cummings & Mehler, Ltd.

(57) ABSTRACT

A digital thermometer with enhanced conformity to the anatomy, such as in and around the mouth of a human being. A non-linear probe has a temperature sensor at a first end adapted to be inserted into the mouth and under the tongue, and a downwardly disposed housing portion at the second end. An intermediate portion of the probe is shaped to rest on the lower lip and/or teeth. The probe can be rotatably or pivotally attached to the housing to protect the probe by being recessed in the housing when not in use and/or to adjust to any size mouth. A plurality of ribs at the intermediate portion of the probe can be included to contact the lips and/or teeth for greater positional stability of the thermometer. A display component displays the measured temperature. Electronic circuitry receives a temperature signal from the temperature sensor, translates the signal into a value representative of the measured temperature, and provides the translated value to the display for displaying the temperature.

34 Claims, 4 Drawing Sheets

U.S. PATENT DOCUMENTS

| | | | |
|---|---|---|---|
| 5,991,652 A | * | 11/1999 | Barthelemy et al. ........ 374/208 |
| 6,090,050 A | * | 7/2000 | Constantinides ............ 600/549 |
| 6,129,673 A | * | 10/2000 | Fraden ....................... 600/474 |
| 6,406,182 B1 | * | 6/2002 | Chen ........................... 374/208 |

FOREIGN PATENT DOCUMENTS

| | | | |
|---|---|---|---|
| JP | 61-270631 | * | 11/1986 |
| JP | 1270631 A | * | 11/1986 |

* cited by examiner

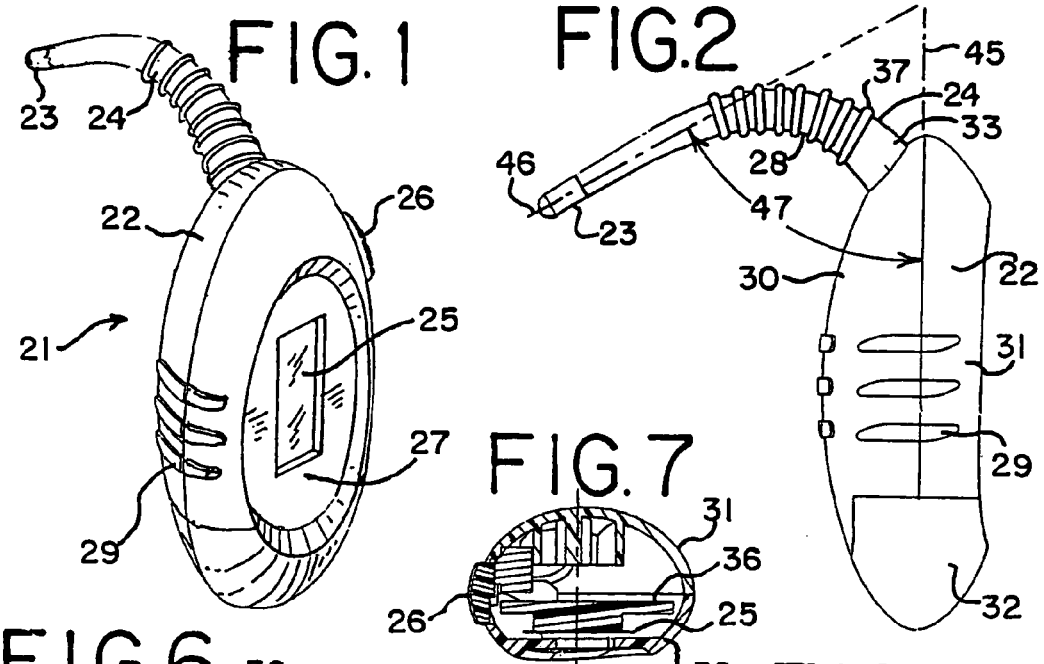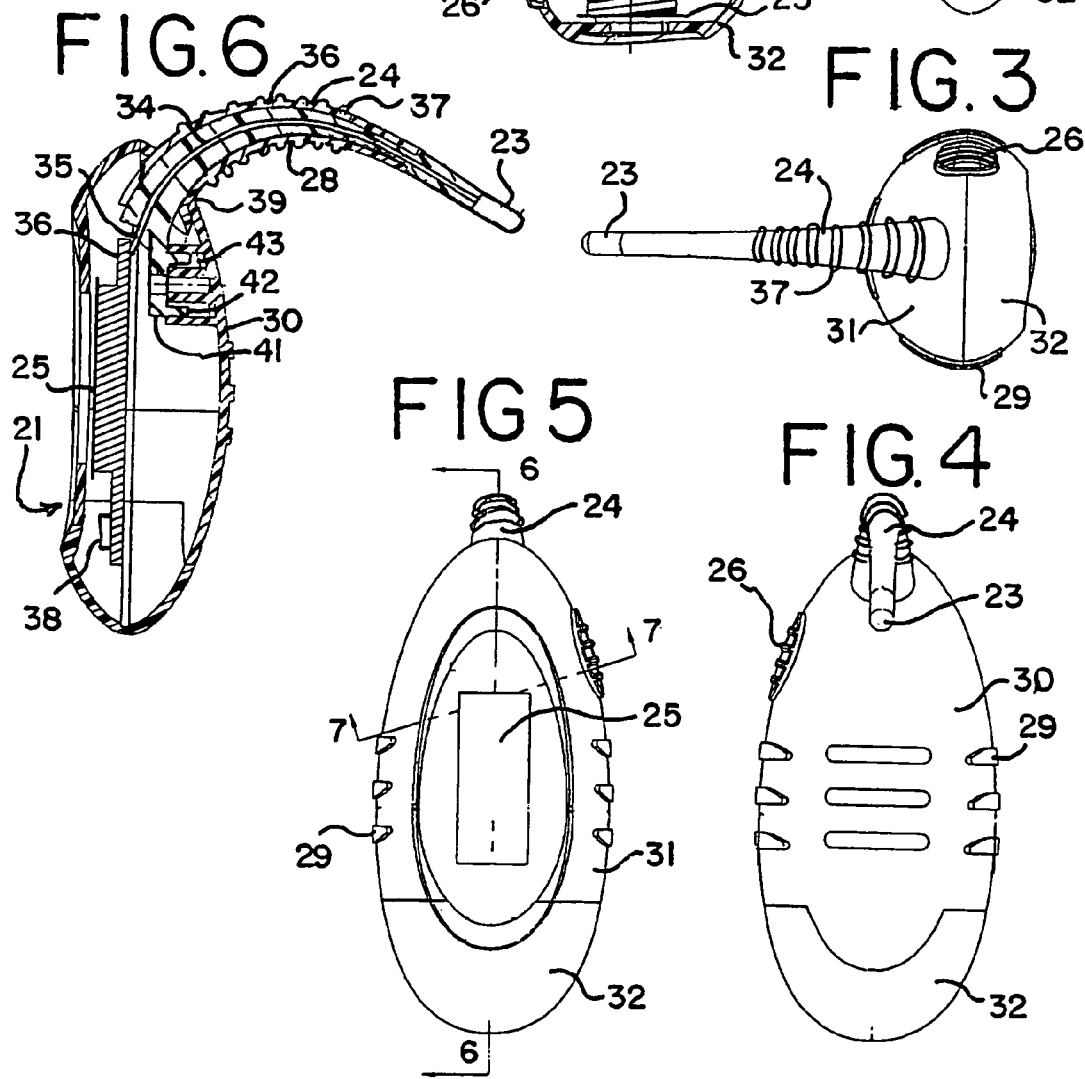

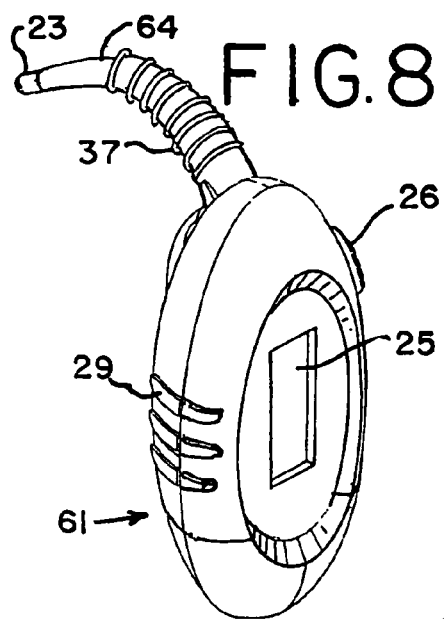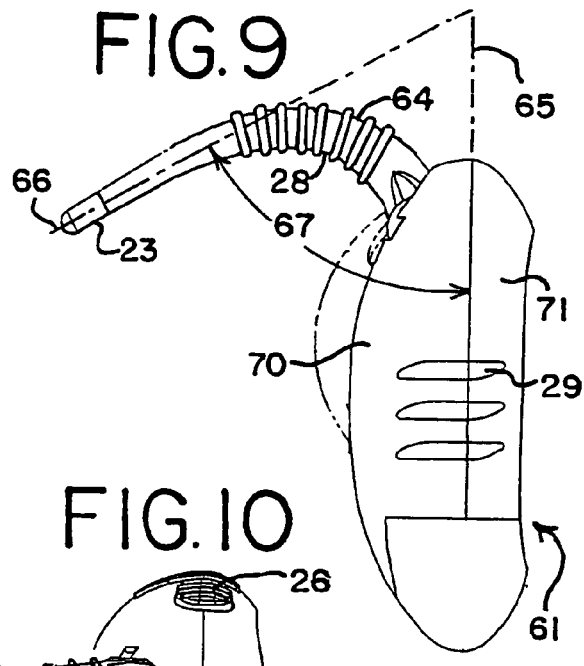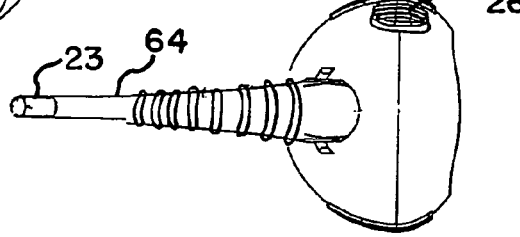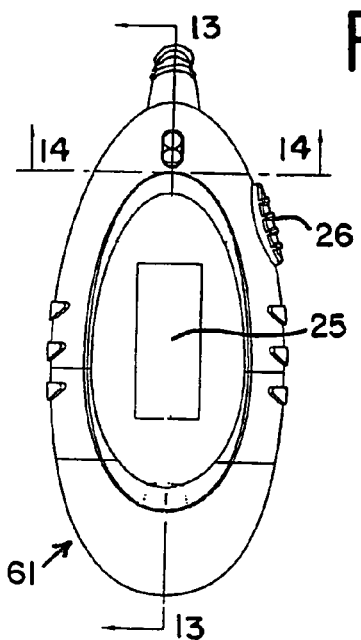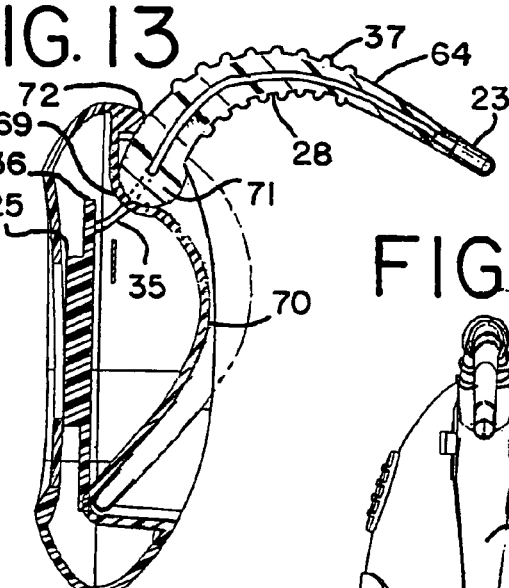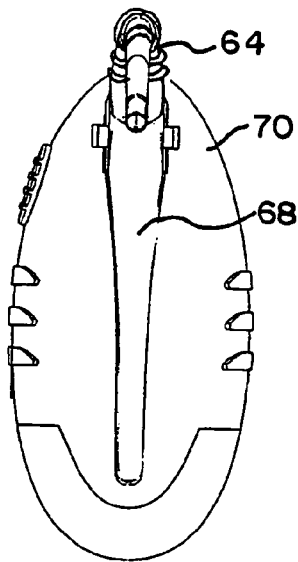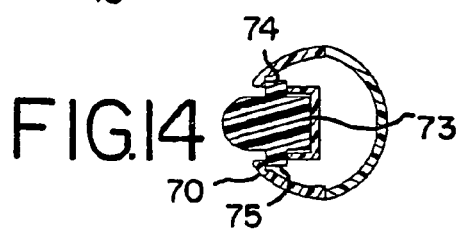

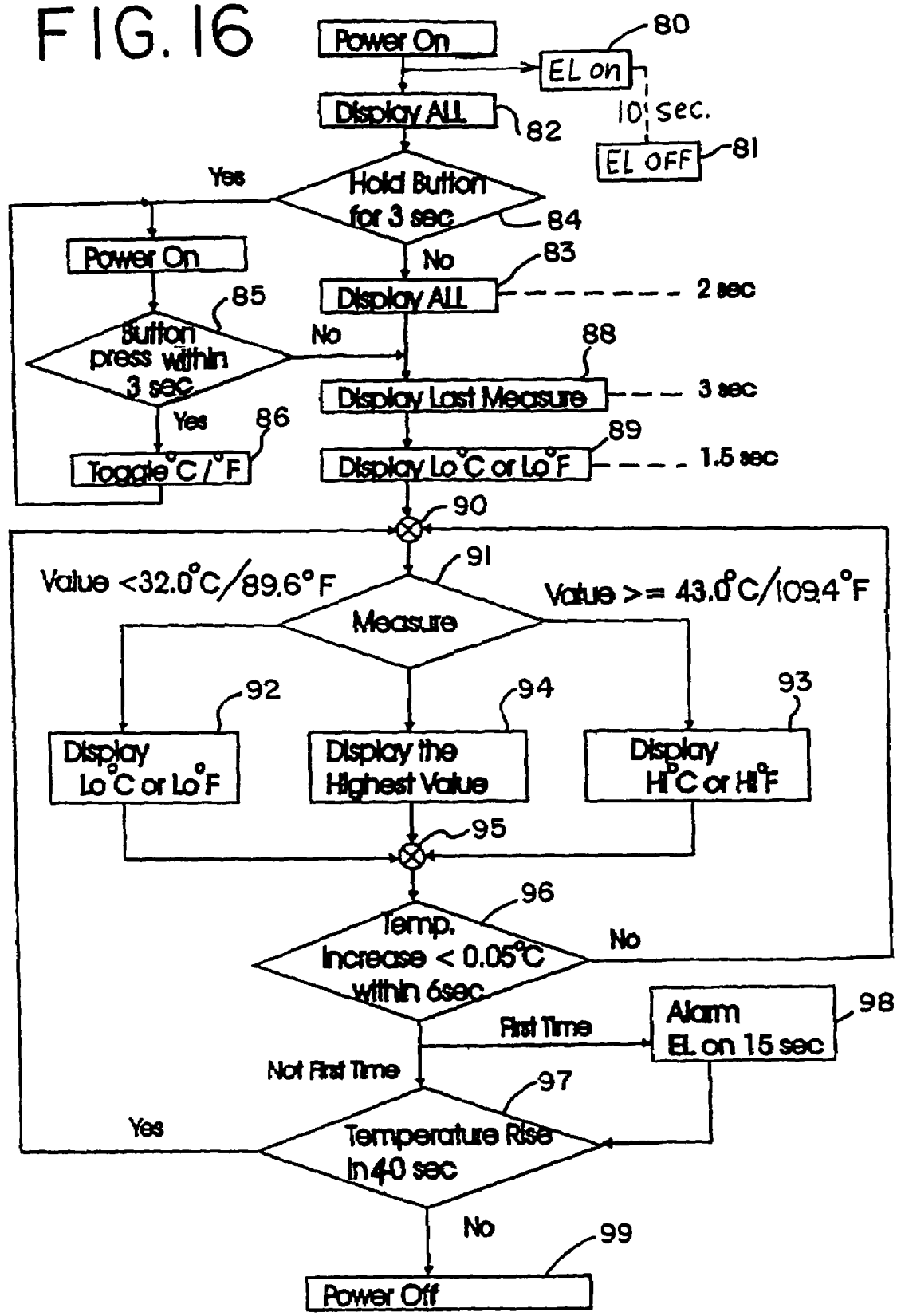

DIGITAL THERMOMETER FOR MEASURING BODY TEMPERATURE

BACKGROUND OF THE INVENTION

This invention relates generally to apparatus for electronically measuring the temperature of a living body, and more particularly, to a digital thermometer that exhibits enhanced conformity to the anatomy of a human being, especially in and around the mouth.

The basic mercury thermometer has been the standard for measuring body temperature for decades and is known virtually throughout the world. It consists of a hollow glass rod with a bulb of mercury at one end and a temperature scale along the glass rod. Typically, it is inserted into the mouth of a human being. Errors can of course be made in reading the temperature from the scale. Care and a certain amount of expertise are required for proper and accurate use.

From the patient's viewpoint, this form of thermometer is awkward because the thermometer must be held under the tongue. As viewed from the side, the rod of the thermometer should be inclined upwardly at an angle of about 30 degrees from the horizontal in order to operate effectively and accurately. Many patients have a natural tendency to bite down on the thermometer with their teeth. The upper teeth of most humans extend forward of the lower teeth with an overbite. When the thermometer is inserted in the mouth, it ordinarily rests on or close to the lower teeth. Thus, when a patient bites down on the thermometer, the lower teeth act as a fulcrum to apply rotational forces on the thermometer. Such rotational forces tend to dislodge the thermometer from under the tongue, usually up to and against the palate. This requires that the thermometer be relocated back under the tongue. To avoid this problem, some patients extend their lower jaw so that the lower teeth are forward of the upper teeth. However, this extension of the lower jaw is unnatural and uncomfortable.

Electronic thermometers have been introduced which emulate the linear structure of the basic mercury thermometer. A numerical display is usually disposed on electronic thermometers to assist in reading the measured temperature. Electronic thermometers also avoid any potential mercury exposure issues associated with a mercury thermometer. These electronic thermometers have a temperature sensing tip at one end for insertion under the tongue, an intermediate linear shaft and an enlarged body or housing at the end opposite from the sensing tip. The enlarged housing contains electronics for translating a temperature signal from the sensing tip into the currently measured temperature. Typically, the enlarged housing also contains a display, such as of the liquid crystal display (LCD) type, for displaying the measured temperature. The enlarged housing also contains a source of electrical power, such as a miniature battery.

Such electronic thermometers with digital displays offer improved convenience and accuracy compared to reading the linear scale of the basic mercury thermometer. However, these linear electronic thermometers exacerbate the problems of keeping the tip of the thermometer under the tongue due to the increased moments of inertia presented by the additional weight and mass of the enlarged housing at the opposite end of the thermometer. This problem can be particularly acute in patients unused to, or uncooperative in, having their temperature taken, such as children or the elderly.

SUMMARY OF THE INVENTION

The present invention provides a digital thermometer with improved balance to avoid the temperature sensing tip from accidentally sliding out from under the tongue of a patient. The present invention also provides a digital thermometer that exhibits enhanced conformity to the anatomy of the patient, particularly in and around the mouth. A probe of the electronic digital thermometer is disposed between a sensing tip at one end and a housing at the opposite end. The probe is non-linear and has an intermediate portion which is shaped to rest over the lower lip and/or lower teeth of a patient. A temperature sensing end of the probe near the temperature-sensing tip is disposed to be positioned under the tongue of a patient and in contact with the floor of the mouth. The housing is downwardly disposed outside of the mouth. Thus, the digital thermometer supports itself by a portion of the probe resting on the patient's lower teeth and/or lower lip.

In its broadest form, the invention may be a non-linear probe adapted to be inserted into the mouth. The probe could be connected to a housing portion, or be connected by electrical conductors to a remote box with a display.

It is a general object of the present invention to provide a digital thermometer and method for measuring the temperature of a living being with better balance to keep the temperature sensing tip properly positioned for enhanced accuracy, such as under the tongue of a patient.

Another object of the present invention is to provide a digital thermometer for measuring the temperature of a human being that better conforms to the anatomy of a human, especially in and around the mouth.

Another object of this invention is to provide a digital thermometer having a component capable of resting against the patient's chin whereby biting down on the thermometer probe will not cause the sensing tip to become dislodged from under the tongue. Instead, greater pressure of the component when it rests against the chin will keep the sensing tip of the digital thermometer located under the tongue.

An object of one embodiment of the present invention is to provide an articulated probe which may be disposed at a selectable angle to the housing.

Yet another object of the present invention is to provide a digital thermometer with a means to protect the probe of the thermometer when not in use.

These and other objects, features and advantages of the present invention will be better understood in connection with the following drawings and description of the preferred embodiments.

BRIEF DESCRIPTION OF THE DRAWINGS

FIG. 1 is perspective view of a digital thermometer incorporating features of the present invention;

FIG. 2 is a side elevational view of the digital thermometer shown in FIG. 1;

FIG. 3 is a top plan view of the digital thermometer shown in FIGS. 1 and 2;

FIG. 4 is a rear or back elevational view of the digital thermometer shown in FIGS. 1 through 3;

FIG. 5 is a front elevational view of the digital thermometer shown in FIGS. 1 through 4;

FIG. 6 is a cross-sectional view of the digital thermometer shown in FIG. 5 with the section taken in the vertical direction along section line 6—6 of FIG. 5;

FIG. 7 is a cross-sectional view of the digital thermometer shown in FIG. 5 with the section taken in an oblique direction along section line 7—7 of FIG. 5;

FIG. 8 is perspective view of an alternative embodiment showing a digital thermometer shown with a pivotal probe;

FIG. 9 is a side elevational view of the alternative embodiment of the digital thermometer shown in FIG. 8;

FIG. 10 is a top plan view of the alternative embodiment of the digital thermometer shown in FIGS. 8 and 9;

FIG. 11 is back or rear elevational view of the alternative embodiment of the digital thermometer shown in FIGS. 8 through 10;

FIG. 12 is a front elevational view of the alternative embodiment of the digital thermometer shown in FIGS. 8 through 11;

FIG. 13 is a cross-sectional view of the alternative embodiment of the digital thermometer shown in FIG. 12 with the section taken in the vertical direction along section line 13—13 of FIG. 12;

FIG. 14 is a cross-sectional view of the alternative embodiment of the digital thermometer shown in FIG. 12 with the section taken in the horizontal direction along section line 14—14 of FIG. 12;

FIG. 16 is flow chart illustration of the steps that an embodiment of the digital thermometer executes when in the operational mode to measure temperature.

DETAILED DESCRIPTION OF THE INVENTION

Figure 15:
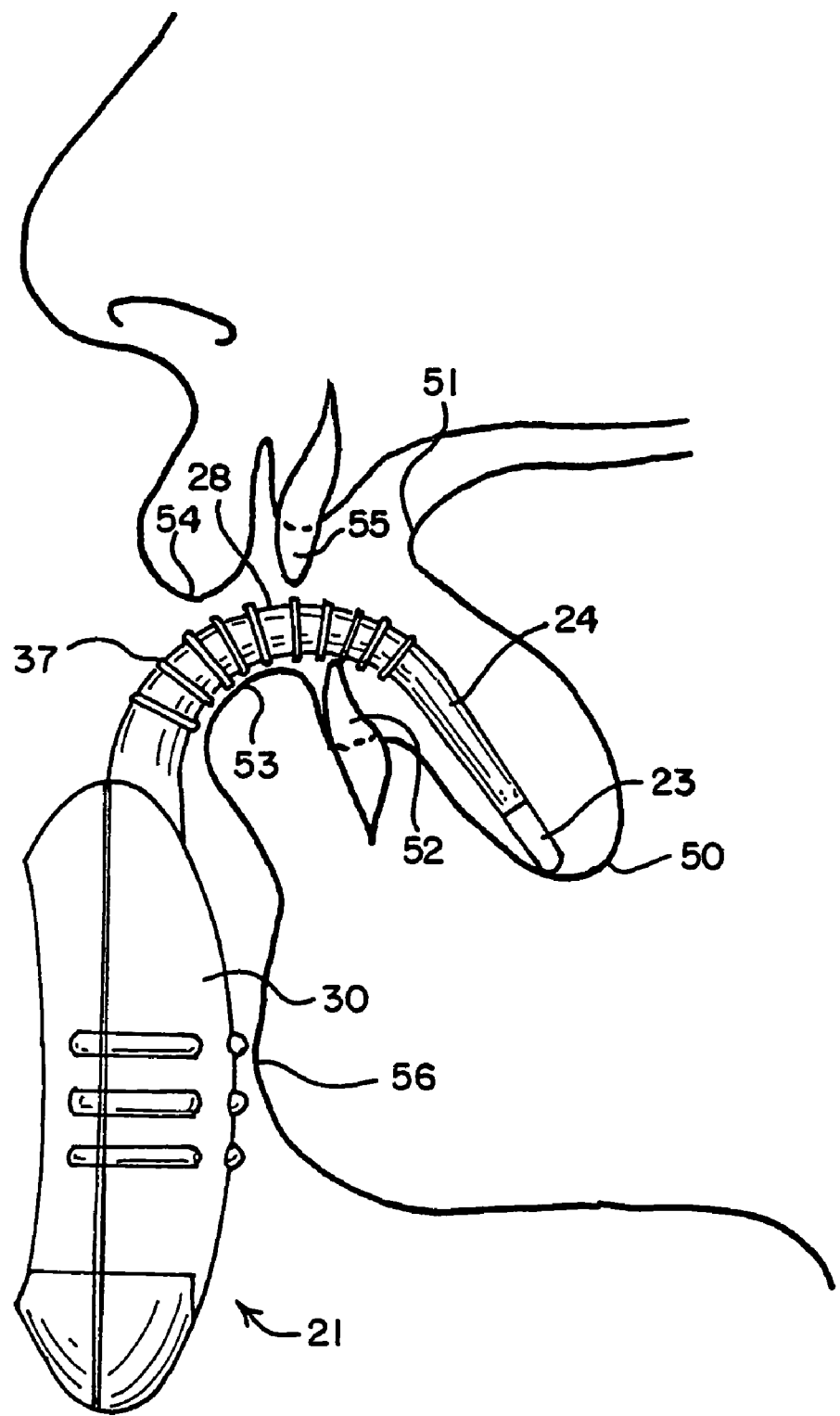
FIG. 15 is a side view illustration of the anatomy in and around a human mouth with the probe portion of the digital thermometer inserted in the mouth.

The various drawing figures will now be referred to in detail. Turning first to FIG. 1, a digital thermometer, which is especially suitable for measuring the body temperature of human being by taking a temperature measurement in the mouth, is generally designated 21. The illustrated digital thermometer 21 includes a housing 22, a temperature sensing tip 23, a probe 24 and a display 25 in the housing 22. A switch 26 is manually operable to electrically activate or deactivate the thermometer 21. For example, switch 26 may be of the pushbutton type.

As can be seen in FIG. 6, the probe 24 has a first or temperature sensing end 23 and a second end 33 that attaches to the housing 22, such as at the back housing portion 30. Temperature sensing end 23 is preferably fitted with a metal tip for better heat conduction to an internal temperature sensor, such as a thermistor. An intermediate portion 28 of probe 24 extends between the first and second ends 23 and 33. Intermediate portion 28 is non-linear. For example, intermediate portion 28 may be curved, and may form an arc. As will be discussed below with respect to FIG. 15, intermediate portion 28 is shaped to rest on and/or to generally conform to the shape of the lower lip and/or the lower teeth of mouth. Of course, the dimensions of probe 24 may be scaled as appropriate to fit a smaller mouth, such as that of a child.

The second end 33 of probe 24 may be attached at an upper location on the housing 22 as illustrated in FIGS. 1 through 6. Housing 22 is thus typically downwardly disposed from the probe 24, including its intermediate portion 28. This combination of probe 24 and housing 22 can generally be described as an inverted J configuration or a "J hook" configuration. If desired, when using this J hook configuration, part of housing 22 may rest against the patient's chin when the temperature sensing tip 23 is inserted into the mouth and under the tongue.

Suitable arrangements are provided to display the temperature measured by the thermometer. In the illustrated embodiment, a front side display 25 is provided. Temperature registration can be presented at other locations, such as at a side, edge, top or bottom location. Remote display also can be achieved with the use of suitable radio transmission technology.

As illustrated in FIGS. 1 and 5, the front side of the housing 22 may be provided with a generally flat or recessed portion 27. Recessed portion 27 has a rectangular cutout area or window for viewing the display 25. Display 25 may be of the liquid crystal display (LCD) type.

Preferably, the housing 22 has a plurality of raised ribs 29 to improve the grip of the thermometer 21. Of course, the raised ribs 29 could alternatively be recessed grooves, or the like, and achieve the same objectives. As can be seen in FIGS. 2 through 6, the ribs 29, or the like, also may be disposed on the back side of the housing 22.

With reference to FIGS. 2, 4 and 5, the illustrated housing 22 can be formed of three parts, such as a back portion 30, a front portion 31 and a bottom portion 32. All three portions 30, 31 and 32 may be formed from any suitable material, typically a polymer. For example, the housing can be formed of a thermoplastic, as by ejection molding. Rear and front housing portions 30 and 31 may snap fit together. Bottom housing portion 32 removably fits to rear and front housing portions 30 and 31 so that the interior of the housing is accessible, as for replacing an internal battery or other power source or component. It will be appreciated that various other structures for the housing portions 30, 31 or 32 are available, or may be readily designed by those of ordinary skill in the art, which would not necessitate a three-part structure for the housing 22.

Rather than having physically separate pieces, probe 24 and at least one of the housing portions, such as back housing portion 30, could be formed or molded as an integral, single component.

FIGS. 6 and 7 illustrate some of the interior details of the thermometer 21, including the probe 24. Probe 24 preferably has an interior portion 34 formed from any suitable material, typically a polymer. For example, the interior portion 34 can be formed of a relatively harder grade of plastic such as polycarbonate, an acrylonitrile butadiene styrene resin, or other polymer having the rigidity or hardness needed of a casing. Interior portion 34 accommodates suitable data transmission means to provide a temperature signal from the temperature sensing tip 23. For example, interior portion 34 can be formed about a pair of electrical conductors 35.

Electrical conductors 35 provide an electronic circuit path from a temperature sensor, such as a thermistor, in the sensing tip 23 to electronic circuitry 38 on a circuit board 36. The electronic circuitry 38 translates the temperature signal from the temperature sensor into a digital value representative of the measured temperature and provides the digital value to display 25 for displaying the measured temperature. Further information about the representative steps implemented by the electronic circuitry 38, and about the representative information displayed on display 25, can be found below with reference to discussion of the flowchart in FIG. 16.

Preferably, the probe 24 has an exterior portion 36 formed over the interior portion 34, as by over molding techniques. Exterior portion 36 consists of a polymer which is softer than the interior portion 34. Examples of these polymers include polyvinyl chloride, silicone polymers, styrene-butadiene elastomers, artificial rubber and the like. Such materials provide a more comfortable feel to the patient's mouth and also provide enhanced friction to facilitate retention at a desired location.

Probe 24 preferably has a plurality of ribs 37 formed in the exterior portion 36, especially in that part of probe 24 that will be in contact with the patient's lips and teeth. For example, several circumferentially disposed ribs may be provided. Typical ribs may have a height in the approximate range of 0.02 to 0.10 inches or 0.51 mm to 2.54 mm. Ribs 37 assist in keeping the thermometer 21 in the position originally inserted in the mouth so that the sensing tip 23 will remain in contact with the tissues under the tongue.

With continuing reference to FIG. 6, an end 41 of probe 24, opposite from the sensing tip 23, extends through an aperture 39 in the rear housing portion 30 into the interior of the thermometer 21. End 41 may be secured to the housing portion 30 by any suitable arrangement. The illustrated embodiment uses pins 42 formed on end 41. When this style of attachment is used, pins 42 fit tightly into correspondingly shaped recesses or bosses 43 formed in the rear housing portion 30 to rigidly secure the probe 24 to the housing 22.

In accordance with one feature of the invention, the probe 24 is shaped to better adapt to the anatomy of that portion of the body at which temperature measurement is to be taken. The illustrated probe 24 is suitable for a human being, especially in and around the mouth. As can be seen in FIG. 2, the housing 22 defines a generally vertical axis or centerline 45, as for example along the intersection of housing portions 30 and 31. Probe 24 generally defines a centerline. This can be in the vicinity of the sensing tip 23, shown as a centerline 46. The tip 23 typically is at a downward angle when positioned in the mouth. An acute angle 47 exists between the centerlines 45 and 46. Angle 47 is in the range of about 20 degrees to about 70 degrees, and preferably between approximately 30 degrees and approximately 60 degrees. These centerline and angle relationships are typical for a probe having the shape of a single curve, such as the probes 24 and 64 shown in FIGS. 1 through 14.

Turning now to FIG. 15, it is known in the medical arts that oral measurement of body temperature is most effective if the temperature sensor is in contact with tissues at the floor 50 of the mouth under the tongue 51. It is also known that two "hot spots" exist under the tongue along the inside of the jaw to either side of the base of the underside of tongue 51. Ideally, a thermometer probe is positioned at one or more of these hot spots during use.

The fit of the digital thermometer 21 to the anatomy in and around the mouth can now be better appreciated. The probe 24 rests on the lower lip 53 and/or the lower teeth 52. When provided, the circumferential ribs 37 help to maintain this positioning. That portion of probe 24 resting on lip 53 and/or teeth 52 is an intermediate portion 28 which is shaped to accommodate and/or generally conform to the shape of the lower lip 53 and/or lower teeth 52. This non-linear or curved contour of the probe 24 effectively prevents movement or shifting of the probe 24 while the temperature measurement is taking place. Because thermometer 21 or 61 does not become dislodged from under the tongue 51, either of these thermometers can more quickly reach a final measured temperature than prior art thermometers.

It can be seen that the attachment of the probe to the housing in FIG. 15 is at a more inclined angle than the embodiments illustrated in FIGS. 1 through 14. FIG. 15 thus illustrates a third embodiment of the invention.

In the illustrated embodiment, as in FIGS. 2 and 9, this contour is of a curved intermediate portion 28. Smooth and constant contours need not be the limit of suitable contours, which can accommodate the lower lip and lower teeth by means of other protruding offset lengths which extend more upwardly (as viewed in FIG. 6) than the rest of the probe 24 or housing 22. The illustrated curved contour achieves these objectives of the invention in an especially efficient and effective manner, which is relatively straightforward to manufacture. The previously described ribs 37 on probe 24 when provided impart additional friction against the lower lip and lower teeth that assists in keeping the probe in place.

The fit of probe 64 of FIGS. 8 through 13 in and around the mouth, and more particularly, on the lower lip 53 and/or lower teeth 52, is generally the same as probe 24.

At the same time, the rear housing portion 30 of thermometer 21 is generally downwardly disposed resting near or against the chin 56 of the patient. Thus, any biting down or pressure on probe 24 with the upper lip 54 and/or upper teeth 55 will not cause the sensing tip 23 of probe 24 to rotate out of position since any significant rotation is prevented when there is contact of rear housing portion 30 against the chin 56. Because the digital thermometer 21 better conforms to the anatomy of the mouth, thermometer 21 also feels less intrusive to a patient than the prior art linear thermometers.

Illustrated in FIGS. 8 through 14 is an alternative embodiment of the digital thermometer, generally identified by reference numeral 61. Digital thermometer 61 has an articulated probe 64 that may be rotated or pivoted between a retracted position and a fully extended position. Referring to FIG. 11, the back housing portion 70 is provided with a recess 68 of complementary shape and size to that of probe 64. Probe 64 may be rotated into the recess 68 when not in use, as illustrated in FIG. 13. For example, positioning of probe 64 in recess 68 protects the probe 64 from damage if thermometer 61 is accidentally dropped. It also reduces thermometer 61 to a more compact size, suitable for conveniently carrying in a pocket, purse, medical bag, or the like.

Probe 64 is shown in FIG. 13 as a single material which may be any of the materials disclosed above for the interior portion 34 of probe 24. Of course, probe 64 could also be over molded with a softer grade of plastic, such as any of the materials disclosed above for the exterior portion 36 of probe 24.

With reference to FIG. 14, the rotating end 71 of probe 64 may be provided with a pair of transversely extending pins 74 and 75 to rotatably secure end 71 of probe 64 in the rear housing portion 70. Rear housing portion 70 has a stop 72 (FIG. 13) that limits the fully extended position of probe 64. As also seen in FIG. 13, the rounded end 71 of probe 64 also contacts a cam surface 69 disposed in the housing 70 to provide frictional resistance to the rotational movement of probe 64. Alternately, a frictional cam surface may be provided on the circuit board 36 to engaged the rounded end 71 of probe 64. Thus, probe 64 can be manually positioned at any intermediate position between the fully opened position shown in FIG. 13 or at the closed position shown by dashed lines also in FIG. 13. Set stop locations can also be provided as desired.

Similar to the thermometer 21 shown in FIG. 2, the thermometer 61 illustrated in FIG. 9, typically defines a generally vertical axis or centerline 65. This axis can, for example, fall generally at the intersection of housing portions 70 and 71. The sensing tip 23 and the adjacent portion of the probe 64 typically define a second axis or centerline 66. An acute angle 67 exists between centerlines 65 and 66. As with thermometer 21, this angle 67 is in the range of about 20 degrees to about 70 degrees when the probe 64 is in a normal using position. Thermometer 61 with its adjustable or articulated probe 64 offers the advantage of adapting to differently sized mouths. Whether the patient has a larger mouth, such as an adult, or a smaller mouth, such as a child, probe 64 may be manually adjusted to a desired angle 47 that best fits any size mouth.

For hygienic reasons, a thin and flexible plastic sheath (not shown) is preferably placed over probe 24 or 64 prior to insertion of probe 24 or 64 into the mouth. The sheath is preferably configured to the shape of probe 24 or 64. Such sheaths are inexpensive and are disposable after each use. A more substantial protective sheath which is similarly configured can be provided for protecting the probe 24 or 64, especially its tip during packaging and between uses.

FIG. 16 is a flowchart which illustrates the steps which can be employed by the digital thermometer 21 or 61 in measuring the temperature of a patient. When the power to thermometer 21 or 61 is first turned on by depressing the power switch 26, electro luminescence of display 25 occurs, such as an indiglo color, for about 10 seconds as indicated by blocks 80 and 81. The thermometer may also emit one or more audible beeps. This indicates to the user that thermometer 21 or 61 is responding to switch 26 and that the internal battery, or other power source, is at a suitable operating voltage. As shown by blocks 82 and 83, when the thermometer 21 or 61 is turned on, display 25 initially activates all of the indicia on the display for about two seconds. If the power switch 26 is held down for about three seconds as shown at decision block 84, thermometer 21 or 61 waits to see if switch 26 is again depressed within about three seconds. If so, decision block 85 will cause the temperature measurement to be changed from degrees Celsius to degrees Fahrenheit, or vice versa, as indicated at block 86. Thermometer 21 or 61 then waits for another three second interval to make sure that the appropriate measurement scale has been selected.

Digital thermometer 21 or 61 then displays the last measured temperature as indicated at block 88. It is desirable to save the last measured temperature since medical personnel may not have recorded the measurement, or may have pressed switch 26 to turn the thermometer off before recording the temperature. By saving and displaying this information, thermometer 21 or 61 reminds the user of the prior measurement.

Thermometer 21 or 61 then proceeds past node 90 to decision block 91 where the first new measurement is made. If the measured temperature at sensing tip 23 is less than 32 degrees C. or 89.6 degrees F., display 25 will indicate this condition as "LO ° C." or "LO ° F." as shown at block 92. On the other hand, if the measured temperature at sensing tip 23 is greater than 43 degrees C. or 109.4 degrees F., display 25 will indicate this condition as "HI ° C." or "HI ° F." as shown at block 93. If the initial temperature measurement is between these HI or LO conditions, the current temperature will be displayed on display 25 as shown in block 94. As also indicated in block 94, each time a new measurement is made, the highest temperature will be displayed.

Once a temperature measurement is made, the temperature measurement process passes through node 95 to decision block 96 where the latest temperature measurement is compared to the previous temperature measurement. If a minimal increase in temperature is not detected on the first measurement, an alarm is indicated as shown at block 98. For example, the alarm may be electro luminescence of display 25 for about 15 seconds, and/or audible beeping sounds. This alarm condition may indicate that the thermometer was not properly placed in the mouth, or that some other problem has occurred.

As long as the new temperature measurement is greater than 0.05 degrees C. or 0.09 degrees F., the temperature measurement process reverts to node 90 and then to block 91 to begin taking another temperature measurement. It will generally take about 10 to 30 seconds for the thermometer to reach the final temperature. When the temperature measurements taken by thermometer 21 or 61 begin to stabilize at a final temperature, the increments between the new and last temperature measurements will be less than 0.05 degrees C. (0.09 degrees F.). At that time, the process passes to decision block 97. If there has been a temperature rise in the last 40 seconds, block 97 returns the measurement process back to node 90 to try another measurement. When the final temperature is reached, electro luminescence of the display 25 may occur again, and/or one or more audible beeps may be emitted to alert the user that the thermometer has finished its task. If the thermometer 21 or 61 is removed from the patient's mouth, the measured temperature continues to be displayed.

If there has been no change in temperature for the last 40 seconds, block 97 causes the power to be turned off as shown in block 99, unless the user has already turned thermometer 21 or 61 off by the on/off switch 26. Thus, from the time that the last appreciable change or increment in temperature was detected, thermometer 21 or 61 holds and displays the temperature for about 40 seconds before turning itself off, thereby conserving battery power and saving battery life.

While preferred forms of the invention have been shown and described, it will be realized that alterations and modifications may be made thereto without departing from the scope of the following claims. For example, other process steps or data flow steps different from those illustrated in FIG. 16 can be practiced. Also, probe shapes other than those illustrated in the drawings can be practiced provided that the probe shapes meet the functional criteria of the invention to provide a non-linear structure which has an offset intermediate portion so that the probe does not fulcrum on the lower teeth or lips to create a situation where the tip of the thermometer tends to move out of engagement with the floor of the mouth, when an oral use is intended.

The invention claimed is:

1. An oral digital thermometer for measuring the temperature of a living being by inserting a portion of the thermometer in the mouth of the being, said oral digital thermometer comprising:

an elongated probe with first and second ends, said elongated probe having a normally non-linear intermediate portion including a curved portion between said first and second ends, said elongated probe having an interior portion that is formed from a rigid material and an exterior portion that is integrally formed on the interior portion from a softer material than said interior portion, said elongated probe tapered in transverse dimension between the first end and the second end, with the first end having a smaller transverse dimension than the second end, a plurality of ribs integrally formed on said curved portion of the elongated probe, said plurality of ribs being positioned to engage the lip and/or teeth of the being and extending over a substantial part of the length of said curved portion, a temperature sensor comprising a thermistor disposed near the first end of the elongated probe;

said first end of the elongated probe, including said temperature sensor, for insertion into the mouth and under the tongue of the being, said first end of the elongated probe defining a first axis, a housing downwardly disposed at the second end of the elongated probe, said housing defining a second axis, said first axis and said second axis defining an acute angle therebetween, a display for displaying a temperature measured by said thermometer, and electronic circuitry in communication with said temperature sensor to receive a temperature signal from said temperature sensor, to translate said temperature signal into a value representative of the temperature measured by the temperature sensor, and to provide the translated value to the display for displaying the measured temperature.

2. The oral digital thermometer in accordance with claim 1 wherein said non-linear intermediate portion of the elongated probe is shaped to rest on the lower lip and/or teeth of the being.

3. The oral digital thermometer in accordance with claim 1 wherein said acute angle is in the range of 20 to 70 degrees.

4. The oral digital thermometer in accordance with claim 1 wherein a portion of the housing engages the chin of the being when the first end of the elongated probe is inserted into the mouth and under the tongue of the being.

5. The oral digital thermometer in accordance with claim 1, wherein said plurality of ribs extend circumferentially around said non-liner intermediate portion of the elongated probe.

6. The oral digital thermometer in accordance with claim 1, wherein said curved portion forms an arc.

7. An oral digital thermometer for measuring the temperature of a living being by inserting a portion of the thermometer in the mouth of the being, said oral digital thermometer comprising:

an elongated probe with first and second ends, said elongated probe having a normally nonlinear intermediate portion including a curved portion between said first and second ends, said elongated probe having an interior portion that is formed from a rigid material and an exterior portion that is integrally formed on the interior portion from a softer material than said interior portion, said elongated probe tapered in transverse dimension between the first end and the second end, with the first end having a smaller transverse dimension than the second end, a plurality of ribs integrally formed on said curved portion of the elongated probe, said plurality of ribs being positioned to engage the lip and/or teeth of the being and extending over a substantial part of the length of said curved portion, a temperature sensor comprising a thermistor disposed near the first end of the probe, said first end of the elongated probe, including said temperature sensor, for insertion into the mouth and under the tongue of the being, a housing downwardly disposed at the second end of the elongated probe, the elongated probe and housing together defining an approximately inverted J configuration, a display for displaying a temperature measured by said thermometer, and electronic circuitry in communication with said temperature sensor to receive a temperature signal from said temperature sensor, to translate said temperature signal into a value representative of the temperature measured by the temperature sensor, and to communicate the translated value to the display for displaying the measured temperature.

8. The oral digital thermometer in accordance with claim 7 wherein said non-linear intermediate portion of the elongated probe is shaped to rest on the lower lip and/or teeth of the being.

9. The oral digital thermometer in accordance with claim 7 wherein a portion of the housing engages the chin of the being when the first end of the elongated probe is inserted into the mouth and under the tongue of the being.

10. The oral digital thermometer in accordance with claim 7, wherein said plurality of ribs extend circumferentially around said non-liner intermediate portion of the elongated probe.

11. The oral digital thermometer in accordance with claim 7, wherein said curved portion forms an arc.

12. An oral digital thermometer for measuring the temperature of a living being by inserting a portion of the thermometer in the mouth of the being, said oral digital thermometer comprising:

an elongated probe with first and second ends, said elongated probe having a non-linear intermediate portion, a temperature sensor comprising a thermistor disposed at the first end of the probe, said first end of the elongated probe, including said temperature sensor, for insertion into the mouth and under the tongue of the being, a housing, said second end of the elongated probe is in frictional engagement with a portion of the housing such that said probe may be adjusted to a selected angle relative to the housing and said probe will be held at the selected angle by said frictional engagement whereby said elongated probe is adjustably connected to said housing such that the distance between the housing and the elongated probe may be adjusted to fit different sizes of mouths, a display for displaying a temperature measured by said thermometer, and electronic circuitry in communication with said temperature sensor to receive a temperature signal from said temperature sensor, to translate said temperature signal into a value representative of the temperature measured by the temperature sensor, and to provide the translated value to the display for displaying the measured temperature.

13. The oral digital thermometer in accordance with claim 12 wherein said non-linear intermediate portion of the elongated probe is shaped to rest on the lower lip and/or teeth of the being.

14. The oral digital thermometer in accordance with claim 12 wherein said elongated probe has an interior portion that is formed from a rigid material and an exterior portion that is integrally formed on the interior portion, said exterior portion formed from a softer material than said interior portion.

15. The oral digital thermometer in accordance with claim 12 further comprising a plurality of ribs integrally formed on said nonlinear intermediate portion of the elongated probe to engage the lip and/or teeth of the being.

16. The oral digital thermometer in accordance with claim 12 wherein a portion of the housing engages the chin of the being when the first end of the elongated probe is inserted into the mouth and under the tongue of the being.

17. The oral digital thermometer in accordance with claim 12 wherein a recess is defined in a portion of said housing such that said elongated probe may be pivoted into said recess when the oral digital thermometer is not in use.

18. An oral digital thermometer for measuring the temperature of a living being by inserting a portion of the thermometer in the mouth of the being, said oral digital thermometer comprising:
   an elongated probe with first and second ends, said elongated probe having a normally non-linear intermediate portion including a curved portion between said first and second ends, said elongated probe having an interior portion that is formed from a rigid material and an exterior portion that is integrally formed on the interior portion from a softer material than said interior portion, said elongated probe tapered in transverse dimension between the first end and the second end, with the first end having a smaller transverse dimension than the second end,
   a plurality of ribs integrally formed on said curved portion of the elongated probe, said plurality of ribs being positioned to engage the lip and/or teeth of the being and extending over a substantial part of the length of said curved portion,
   a temperature sensor comprising a thermistor disposed at the first end of the probe,
   said first end of the probe, including said temperature sensor, for insertion into the mouth and under the tongue of the being,
   a housing portion, the non-linear intermediate portion of the elongated probe being offset with respect to the housing portion and the temperature sensor,
   a display for displaying a temperature measured by said thermometer, and
   electronic circuitry in communication with said temperature sensor to receive a temperature signal from said temperature sensor, to translate said temperature signal into a value representative of the temperature measured by the temperature sensor, and to communicate the translated value to the display for displaying the measured temperature.

19. The oral digital thermometer in accordance with claim 18 wherein said non-linear intermediate portion of the probe is shaped to rest on the lower lip and/or teeth of the being.

20. The oral digital thermometer in accordance with claim 18 wherein a portion of the housing engages the chin of the being when the first end of the elongated probe is inserted into the mouth and under the tongue of the being.

21. The oral digital thermometer in accordance with claim 18, wherein said plurality of ribs extend circumferentially around said non-liner intermediate portion of the elongated probe.

22. The oral digital thermometer in accordance with claim 18, wherein said curved portion forms an arc.

23. An oral digital thermometer for measuring the temperature of a living being by inserting a portion of the thermometer in the mouth of the being, said oral digital thermometer comprising:
   an elongated probe with first and second ends, said elongated probe having a normally non-linear intermediate portion including a curved portion between said first and second ends, said elongated probe having an interior portion that is formed from a rigid material and an exterior portion that is integrally formed on the interior portion from a softer material than said interior portion, said elongated probe tapered in transverse dimension between the first end and the second end, with the first end having a smaller transverse dimension than the second end,
   a plurality of ribs integrally formed on said curved portion of the elongated probe, said plurality of ribs being positioned to engage the lip and/or teeth of the being and extending over a substantial part of the length of said curved portion,
   a temperature sensor comprising a thermistor disposed near the first end of the probe,
   said first end of the probe, including said temperature sensor, for insertion into the mouth and under the tongue of the being,
   a housing portion at the second end of the elongated probe, said housing portion being disposed generally downwardly with respect to the non-linear intermediate portion of the elongated probe,
   a display for displaying a temperature measured by said thermometer, and
   electronic circuitry in communication with said temperature sensor to receive a temperature signal from said temperature sensor, to translate said temperature signal into a value representative of the temperature measured by the temperature sensor, and to provide the translated value to the display for displaying the measured temperature.

24. An oral digital thermometer for measuring the temperature of a living being by inserting a portion of the thermometer in the mouth of the being, said oral digital thermometer comprising:
   an elongated probe with first and second ends, said elongated probe having a normally non-linear intermediate portion including a curved portion between said first and second ends, said elongated probe having a plurality of ribs integrally formed on said non-linear intermediate portion of the elongated probe to engage the lip and/or teeth of the being,
   a plurality of ribs integrally formed on said curved portion of the elongated probe, said plurality of ribs being positioned to engage the lip and/or teeth of the being and extending over a substantial part of the length of said curved portion,
   a temperature sensor comprising a thermistor disposed near the first end of the probe,
   said first end of the elongated probe, including said temperature sensor, for insertion into the mouth and under the tongue of the being,
   a housing portion at the second end of the elongated probe, said housing portion being disposed generally downwardly with respect to the nonlinear intermediate portion of the probe,
   a display for displaying a temperature measured by said thermometer, and
   electronic circuitry in communication with said temperature sensor to receive a temperature signal from said temperature sensor, to translate said temperature signal into a value representative of the temperature measured by the temperature sensor, and to provide the translated value to the display for displaying the measured temperature.

25. The oral digital thermometer in accordance with claim 24 wherein said non-linear intermediate portion of the elongated probe is shaped to rest on the lower lip and/or teeth of the being.

26. The oral digital thermometer in accordance with claim 24, said elongated probe further comprising an interior portion that is formed from a rigid material and an exterior portion that is integrally formed on the interior portion from a softer material than said interior portion.

27. The oral digital thermometer in accordance with claim 24 wherein a portion of the housing engages the chin of the being when the first end of the elongated probe is inserted into the mouth and under the tongue of the being.

28. The oral digital thermometer in accordance with claim 24, wherein said plurality of ribs extend circumferentially around said non-liner intermediate portion of the elongated probe.

29. The oral digital thermometer in accordance with claim 24, wherein said curved portion forms an arc.

30. The oral digital thermometer in accordance with claim 23 wherein said non-linear intermediate portion of the elongated probe is shaped to rest on the lower lip and/or teeth of the being.

31. The oral digital thermometer in accordance with claim 23, wherein said curved portion forms an arc.

32. The oral digital thermometer in accordance with claim 23 wherein a portion of the housing engages the chin of the being when the first end of the elongated probe is inserted into the mouth and under the tongue of the being.

33. The oral digital thermometer in accordance with claim 23, wherein said plurality of ribs extend circumferentially around said non-liner intermediate portion of the elongated probe.

34. An oral digital thermometer for measuring the temperature of a living being by inserting a portion of the thermometer in the mouth of the being, said oral digital thermometer comprising:

an elongated probe with first and second ends, said elongated probe having a non-linear intermediate portion, a temperature sensor comprising a thermistor disposed at the first end of the probe, said first end of the elongated probe, including said temperature sensor, for insertion into the mouth and under the tongue of the being, a housing, a recess is defined in a portion of said housing such that said elongated probe may be pivoted into said recess when the oral digital thermometer is not in use, said elongated probe adjustably connected to said housing such that the distance between the housing and the elongated probe may be adjusted to fit different sizes of mouths, a display for displaying a temperature measured by said thermometer, and electronic circuitry in communication with said temperature sensor to receive a temperature signal from said temperature sensor, to translate said temperature signal into a value representative of the temperature measured by the temperature sensor, and to provide the translated value to the display for displaying the measured temperature.

* * * * *

UNITED STATES PATENT AND TRADEMARK OFFICE
CERTIFICATE OF CORRECTION

PATENT NO. : 7,060,037 B2  Page 1 of 1
APPLICATION NO. : 10/141429
DATED : June 13, 2006
INVENTOR(S) : Lussier et al.

It is certified that error appears in the above-identified patent and that said Letters Patent is hereby corrected as shown below:

Col. 1, line 7, insert --an-- after "This invention relates generally to".
Col. 2, line 55, insert --a-- after "FIG. 1 is".
Col. 3, line 4, insert --a-- after "FIG. 8 is"; line 10, insert --a-- after "FIG. 11 is"; line 28, insert --a-- after "FIG. 16 is"; line 37-38, insert --a-- after "measuring the body temperature of"; line 57, insert --the-- after "lower teeth of".
Col. 12, line 50, "nonlinear" should read --non-linear--.

Signed and Sealed this

Twenty-seventh Day of November, 2007

JON W. DUDAS
*Director of the United States Patent and Trademark Office*